United States Patent
Walton

(10) Patent No.: US 9,306,718 B2
(45) Date of Patent: Apr. 5, 2016

(54) SYSTEM AND METHOD FOR MITIGATING HELICOPTER ROTOR BLOCKAGE OF COMMUNICATIONS SYSTEMS

(71) Applicant: Honeywell International Inc., Morristown, NJ (US)

(72) Inventor: Andrew Mark Walton, Tewkesbury (GB)

(73) Assignee: Honeywell International Inc., Morris Plains, NJ (US)

( * ) Notice: Subject to any disclaimer, the term of this patent is extended or adjusted under 35 U.S.C. 154(b) by 577 days.

(21) Appl. No.: 13/956,650

(22) Filed: Aug. 1, 2013

(65) Prior Publication Data

US 2015/0304085 A1 Oct. 22, 2015

(51) Int. Cl.
H04L 5/00 (2006.01)
H04B 7/185 (2006.01)
H04L 1/00 (2006.01)

(52) U.S. Cl.
CPC .......... *H04L 5/0051* (2013.01); *H04B 7/18506* (2013.01); *H04L 1/00* (2013.01); *H04L 5/0082* (2013.01)

(58) Field of Classification Search
CPC ................ H04L 5/0051; H04L 5/0082; H04L 27/2628–27/2636; H04B 7/18506
See application file for complete search history.

(56) References Cited

U.S. PATENT DOCUMENTS

| 5,347,282 A * | 9/1994 | La Grange et al. ........... 342/193 |
| 5,471,880 A * | 12/1995 | Lang et al. ....................... 73/660 |
| 7,298,696 B1 * | 11/2007 | Wu ................................. 370/229 |
| 8,019,284 B2 | 9/2011 | Monk |
| 8,238,284 B2 | 8/2012 | Wilcoxson et al. |
| 2010/0330926 A1 | 12/2010 | Monk |
| 2012/0294384 A1 | 11/2012 | Wilcoxson et al. |
| 2013/0246884 A1 * | 9/2013 | Lee et al. ....................... 714/755 |

FOREIGN PATENT DOCUMENTS

| EP | 2639155 | 9/2013 |
| WO | 0205505 | 1/2002 |
| WO | 2012036605 | 3/2012 |

OTHER PUBLICATIONS

European Patent Office, "Extended EP Search Report from EP Application No. 14178064.3 mailed Mar. 19, 2015", "from Foreign Counterpart of U.S. Appl. No. 13/956,650", Mar. 19, 2015, pp. 14, Published in: EP.

* cited by examiner

*Primary Examiner* — Paul H Masur
(74) *Attorney, Agent, or Firm* — Fogg & Powers LLC

(57) ABSTRACT

A method for mitigating helicopter rotor blockage of communications comprising fast fourier transforming (FFT) pilot symbols, implementing a time delay of one frame, applying a forgetting factor to an accumulated spectrum, and performing a leaky coherent integration, wherein the leaky coherent integration adds a result of the fast fourier transform of the one current frame of data to the accumulated spectrum. The method also comprises calculating a threshold, wherein the threshold is based on a mean energy of all FFT bins in the accumulated spectrum, masking the FFT bins, wherein masking comprises retaining only FFT bins that exceed the threshold and above a minimum expected rotor blocking frequency, inverse fast fourier transforming the accumulated spectrum, erasing the pilot symbols below the threshold and removing them from the signal, and erasing data symbols that lie in a blockage by setting associated bit-log likelihood ratios to zero.

18 Claims, 8 Drawing Sheets

SYSTEM AND METHOD FOR MITIGATING HELICOPTER ROTOR BLOCKAGE OF COMMUNICATIONS SYSTEMS

BACKGROUND

Communications systems consist of forward and return links of communication. Forward links are generally communications from a ground station or other sender to a receiver. In satellite communications, the ground station sends a signal to a satellite, which sends the signal to a receiver. Return links are communications in the other direction, back to the ground station. Often, the forward link contains frames of data separated by contiguous unique words and containing regularly spaced pilot symbols to aid in demodulation. Pilot symbols are placed into the data stream at certain intervals or patterns to aid in the estimation of a communication signal.

Satellite and other communications systems on helicopters are typically configured with the antenna below the main rotors so that the line of slight from the antenna to the satellite or the signal broadcast is regularly blocked by the rotor blades as they rotate. These blockages adversely affect the performance of both the forward and return links.

SUMMARY

In one embodiment, a method for mitigating helicopter rotor blockage of communications is provided. The method comprises fast fourier transforming (FFT) pilot symbols of one current frame of data of a series of at least one frame of data. A time delay of one frame is implemented by rotating the complex FFT bins. A leaky coherent integration is performed, wherein the leaky coherent integration adds a result of the fast fourier transform of the one current frame of data to an accumulated spectrum; applying a forgetting factor to the accumulated spectrum, wherein the forgetting factor is a factor of less than one, wherein the accumulated spectrum is a fast fourier transformed of at least one previous frame of data of a series of at least one frame of data. The method further comprises calculating a threshold, wherein the threshold is based on a mean energy of all FFT bins in the accumulated spectrum, wherein FFT bins are characterized by a discrete range of frequencies along the accumulated spectrum, masking the FFT bins, wherein masking comprises retaining only FFT bins that exceed the threshold and above a minimum expected rotor blocking frequency and adjacent FFT bins. The accumulated spectrum is inverse fast fourier transformed and compared to a threshold to detect blockage events. Pilot symbols that fall within blockages are removed from the signal parameter estimation process and bit-log likelihood ratios corresponding to data symbols within blockages are set to zero.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 a block diagram of one embodiment of an exemplary method for mitigating helicopter rotor blockage of communications;

Figure 1:
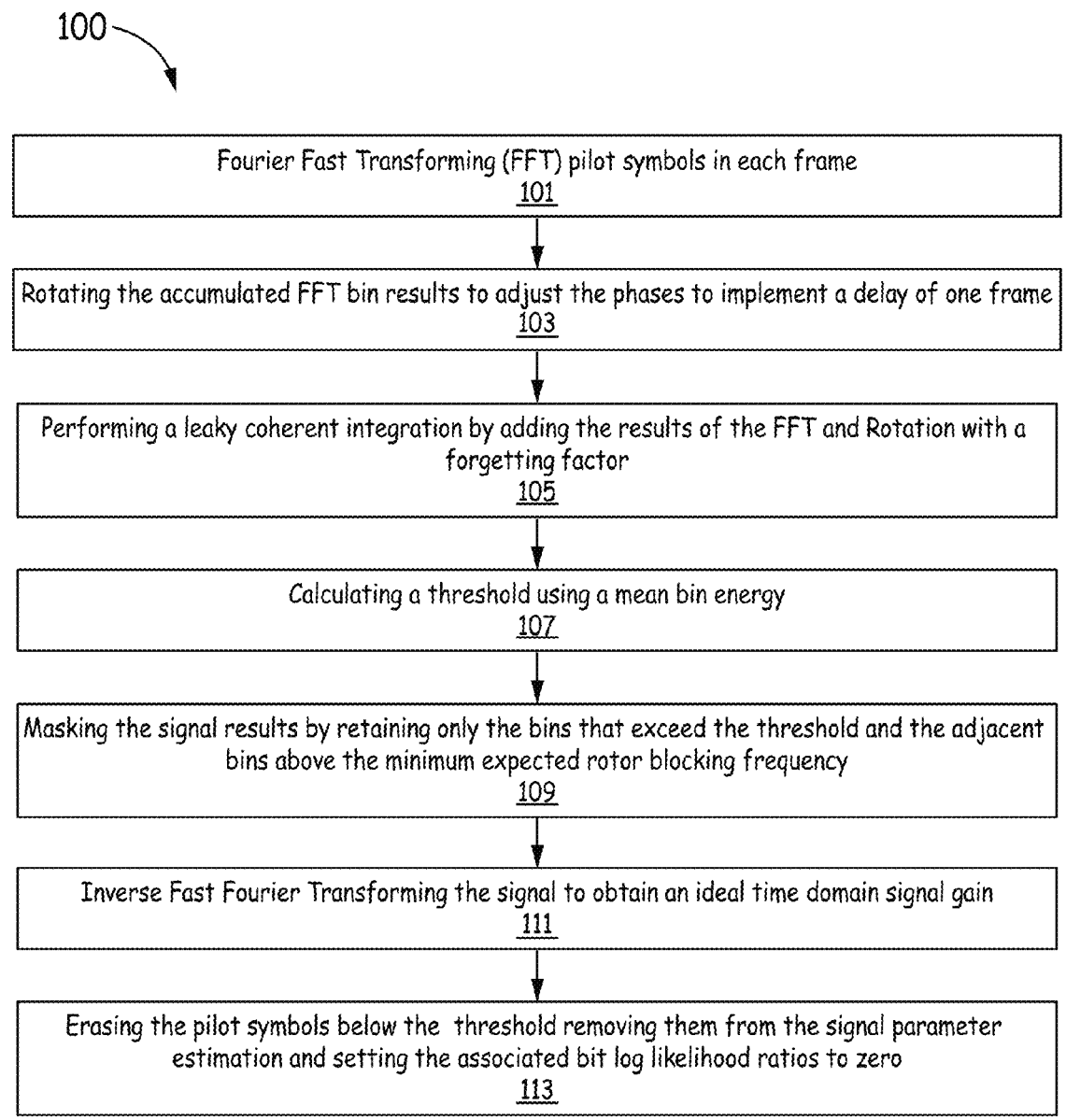

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates one embodiment of an exemplary method for mitigating helicopter rotor blockage of communications 100. The method 100 begins by Fast Fourier Transforming (FFT) pilot symbols in each frame of data received by a receiver 101. In one embodiment, the receiver is a satellite receiver. A forward link signal comprises frames of data separated by contiguous unique words, and also contains regularly spaced pilot symbols to aid in the demodulation of the signal. The pilot symbols in each frame of data are fed into a real to complex FFT. In one embodiment, computational savings can be made by only calculating half of the output values, as the negative frequency bins are the complex conjugate of the positive frequency bins. It is also not possible to process more than one frame at a time when the pilot symbols are not found at a constant rate across the frame boundary. A large FFT relative to the number of pilot symbols is required to allow coherent integration from frame to frame. In one embodiment, the pilot symbols are fed into an 8 k real to complex FFT.

For systems in low signal to noise ratio (SNR), performance can be improved by increasing the FFT length, which allows a larger forgetting factor and so more integration. This is at the expense of increased computation and memory.

At block 103, the accumulated FFT bin results are shifted in time by a frame. In one embodiment, since the time shift is a non-integer multiple of the pilot symbol period, it is most efficiently performed by rotating the complex frequency bins, adjusting the phase angles. It is to be understood that block 103 depicts an exemplary embodiment and is not to be taken in a limiting sense. In other embodiments, the time shift may be implemented in a different fashion, using techniques that will be appreciated by those having ordinary skill in the art to cause such a time delay.

At block 105, the contribution of the old signal information is exponentially de-weighted by performing a leaky coherent integration by adding the results of the FFT and rotation with a forgetting factor. The forgetting factor (less than one) is applied to the accumulated FFT bin results before adding new frames.

At block 107, a blockage threshold is calculated as a multiple of the mean bin energy of all FFT bins. At block 109, all FFT bins with energy greater than the threshold and that lie within an allowed interval corresponding to an expected rotor blocking frequency are copied along with adjacent FFT bins to a second spectrum with the remaining FFT bins of the second spectrum set to zero. This eliminates the direct current (DC) component in the FFT bins while retaining the significant components of a comb spectrum from an ideal signal and also eliminates noise. This is referred to as the noise reduced spectrum.

At block 111, an inverse FFT is applied to the noise reduced spectrum to convert it back to a real signal in the time domain. The predicted signal for the frame ahead is considered and the intervals when the signal falls below the threshold are the predicted blockages.

At block 113, pilot symbols below the threshold are removed from the signal parameter estimation. In one embodiment, associated bit log likelihood ratios (LLRs) associated with data symbols are set to zero. In a complete blockage the measured symbols will be just noise, the true constellation value is at zero. A zero value for Quadrature Phase-Shift Keying (QPSK) bearers results in zero valued LLRs that impart no information. A zero value for 16-Quadrature Amplitude Modulation (QAM) bearers results in a zero values LLR for the most significant bit and a non-zero value for the least significant (usually parity) bit that, depending on the symbol mapping, may favor a zero bit value. The noise process itself will generate non-zero LLR values. In the event of a total blockage, performance can be improved by implementing an erasure strategy. Here the symbols during the blockage have their associated bit values replaced by zero, to represent no information. If the blockage is partial then information could be lost by using this strategy. In other embodiments, parameter estimation can be modified to make it more adaptive at the transitions or to de-weight the blocked symbols. To implement erasure or modification, the terminal would have to know it was on a helicopter and a periodic blockage detector would be needed.

Figure 2:
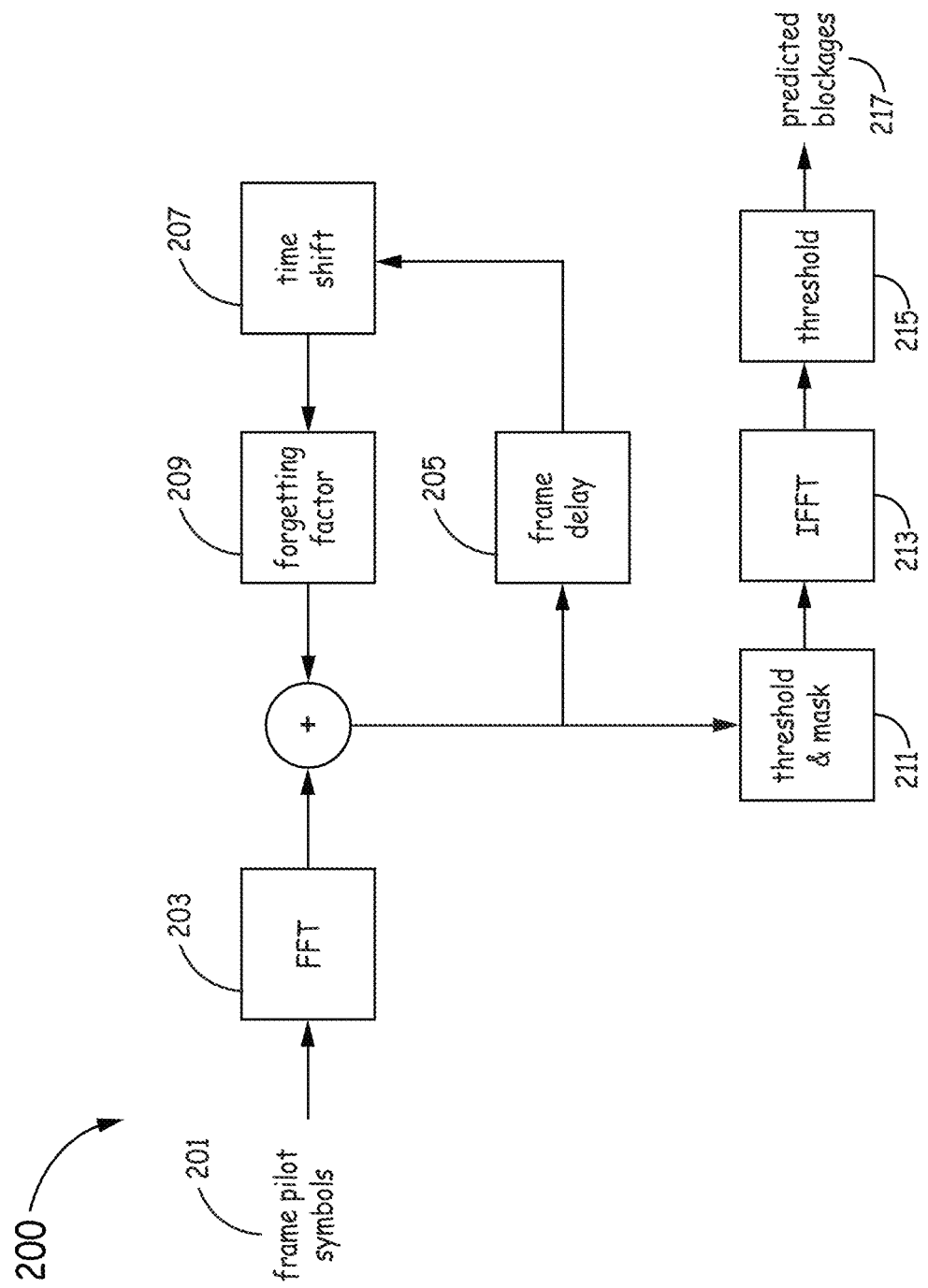
FIG. 2 illustrates a block diagram of an example system for mitigating helicopter rotor blockage of communications.

FIG. 2 illustrates a block diagram of an example helicopter rotor blockage detector 200. Frame pilot symbols 201 are inputs to the system. At block 201, the frame pilot symbols 201 are passed through an FFT. The output is sent to a summing block. At block 205, a frame delay is introduced which delays the signal by one frame of data. At block 207, the frame delay causes a time shift of a frame. The time shift is a non-integer multiple of the pilot symbol period, where the pilot symbol period is the time between receiving consecutive pilot symbols. Therefore, it is most efficiently time shifted by rotating the complex frequency FFT bins. At block 209, de-weighting of the old signal is accomplished by applying applying forgetting factor (a factor of less than one), to the accumulated spectrum. After applying the forgetting the factor, the signal is coupled back to the summing block. At 211, a threshold and mask are calculated. The threshold is calculated as a multiple of the mean energy in the FFT bins of the spectrum. A mask is applied to the signal by copying only the FFT bins which have energy greater than the threshold and are within an allowed interval, and adjacent FFT bins to another spectrum where the other FFT bins are set to zero. This effectively removes the DC component while retaining the significant components of the comb spectrum form the ideal signal and eliminates noise. At block 213, this noise reduced spectrum has an IFFT applied to it to convert the signal back to a real signal in the time domain. At block 215, the predicted signal from the frame ahead is then considered and the intervals when the signal falls below the threshold are the predicted blockages 217.

Figure 3:
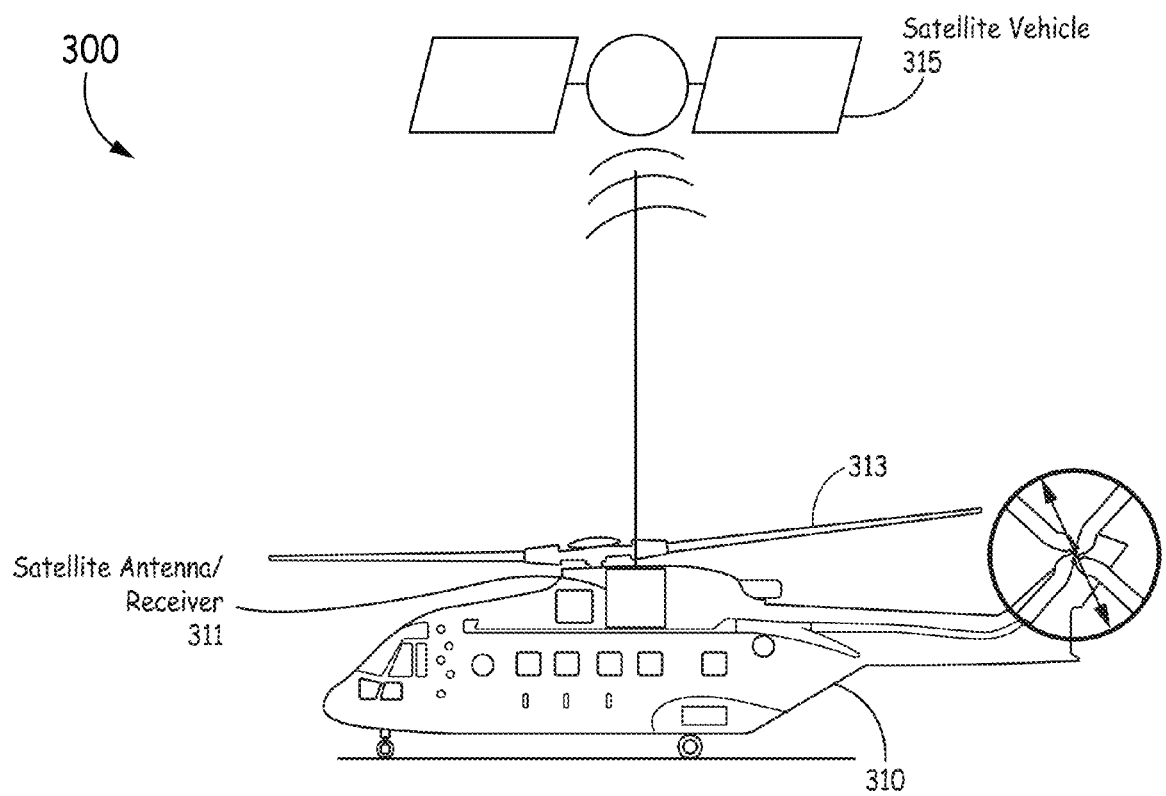
FIG. 3 illustrates one embodiment of a helicopter rotor blockage block diagram.

FIG. 3 shows a side view 300 of a helicopter 310 equipped with satellite antenna and receiver 311 on the top side of the fuselage of the helicopter 310. The satellite antenna and receiver 311 are configured to communicate with satellite vehicle 315 overhead. Helicopter rotor blades 313 are positioned above the satellite antenna/receiver 311 causing repeating blockages of the communication path between antenna/receiver 311 and satellite vehicle 315. The blockage of communication by helicopter rotor blades 313 can disrupt communication functions of the helicopter, and can reflect and deflect both forward and return link signals. It is to be understood that FIG. 3 depicts an exemplary embodiment presented by way of example and not by way of limitation. In particular, other embodiments may use a different antenna/receiver in communication with the ground or other aircraft, where the rotors cause a similar intermittent blockage, or any other kind of regularly occurring blockage.

Figure 4:
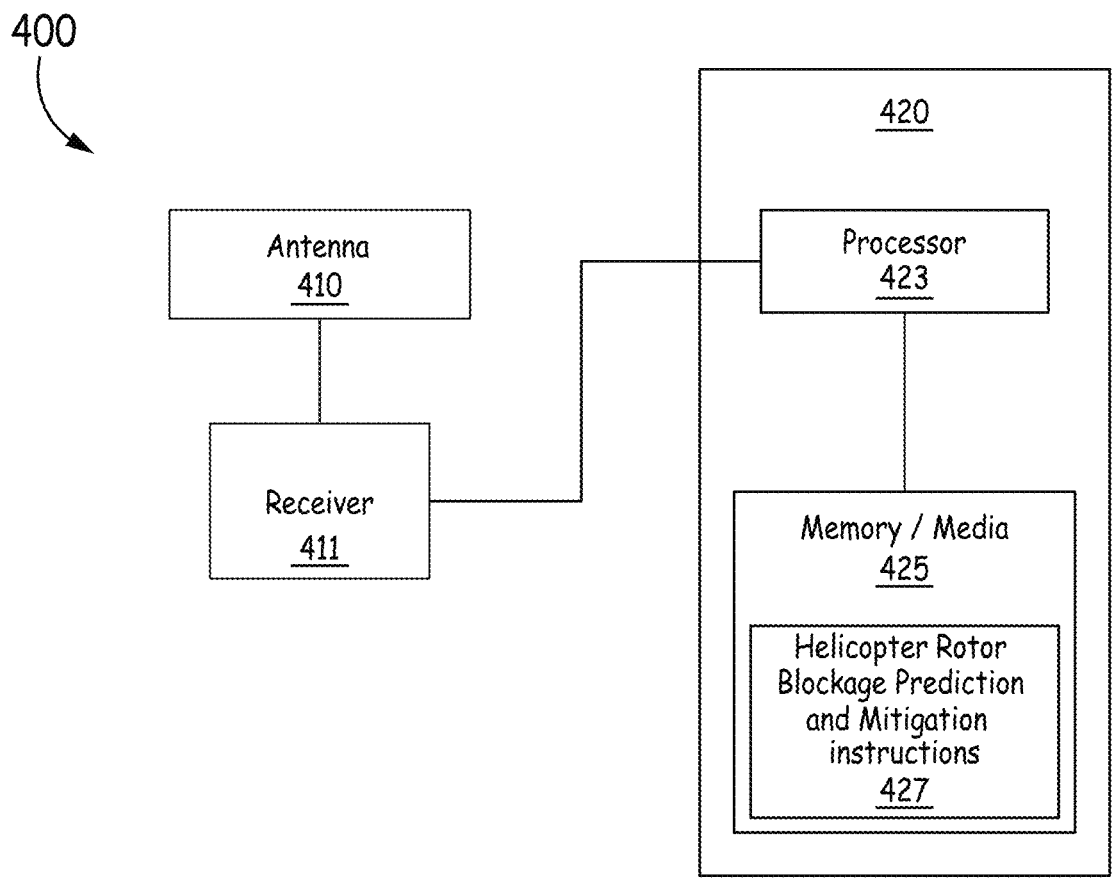
FIG. 4 is a hardware block diagram according to one embodiment of an exemplary system for mitigating helicopter rotor blockage of communications.
Figure 5A:
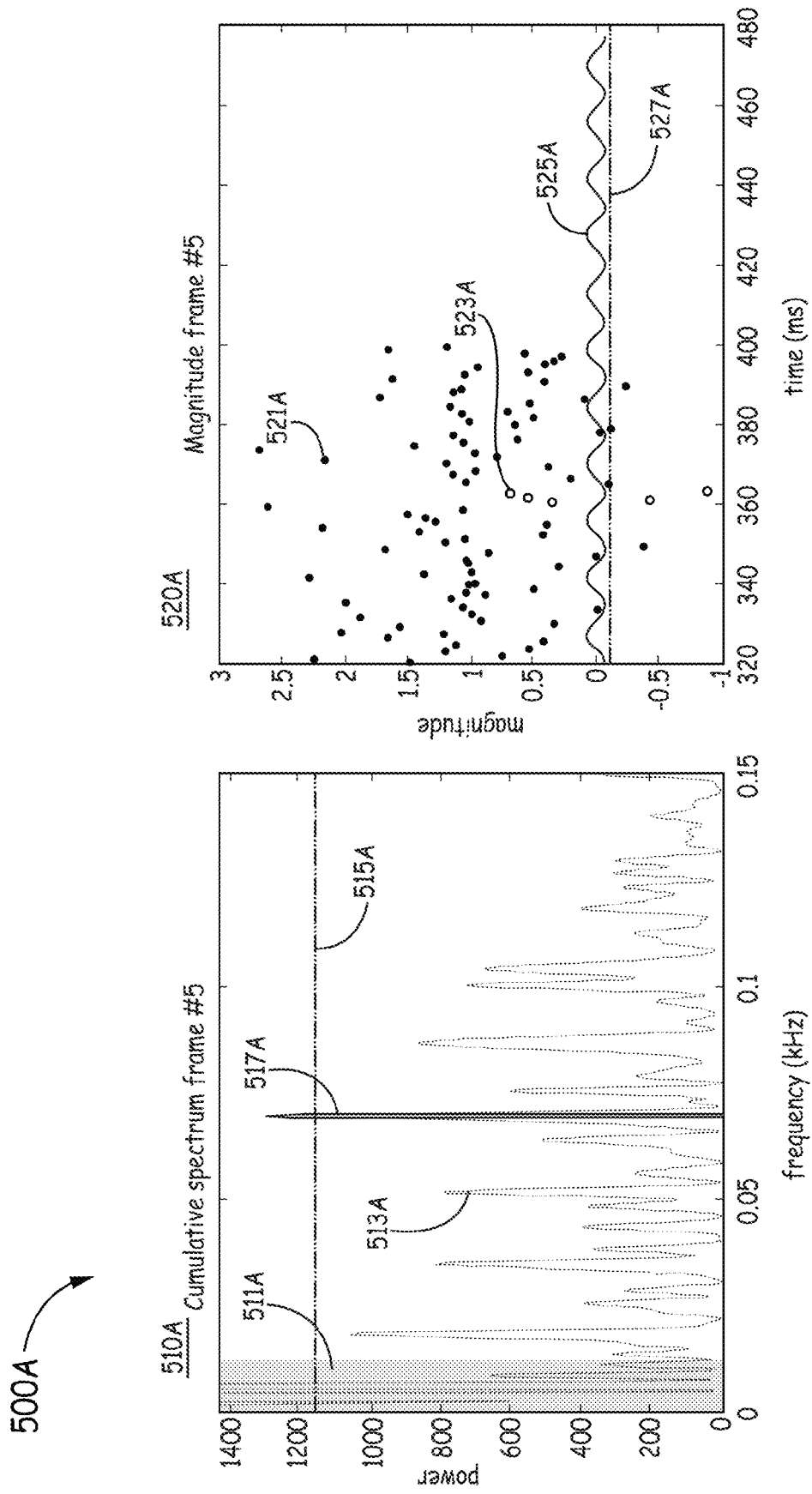
FIG. 5A illustrates a cumulative spectrum power graphs and magnitudes of the inverse fast fourier transformed signal for the current and next frame as seen by a receiver, according to one embodiment at 5 frames of data.
Figure 5B:
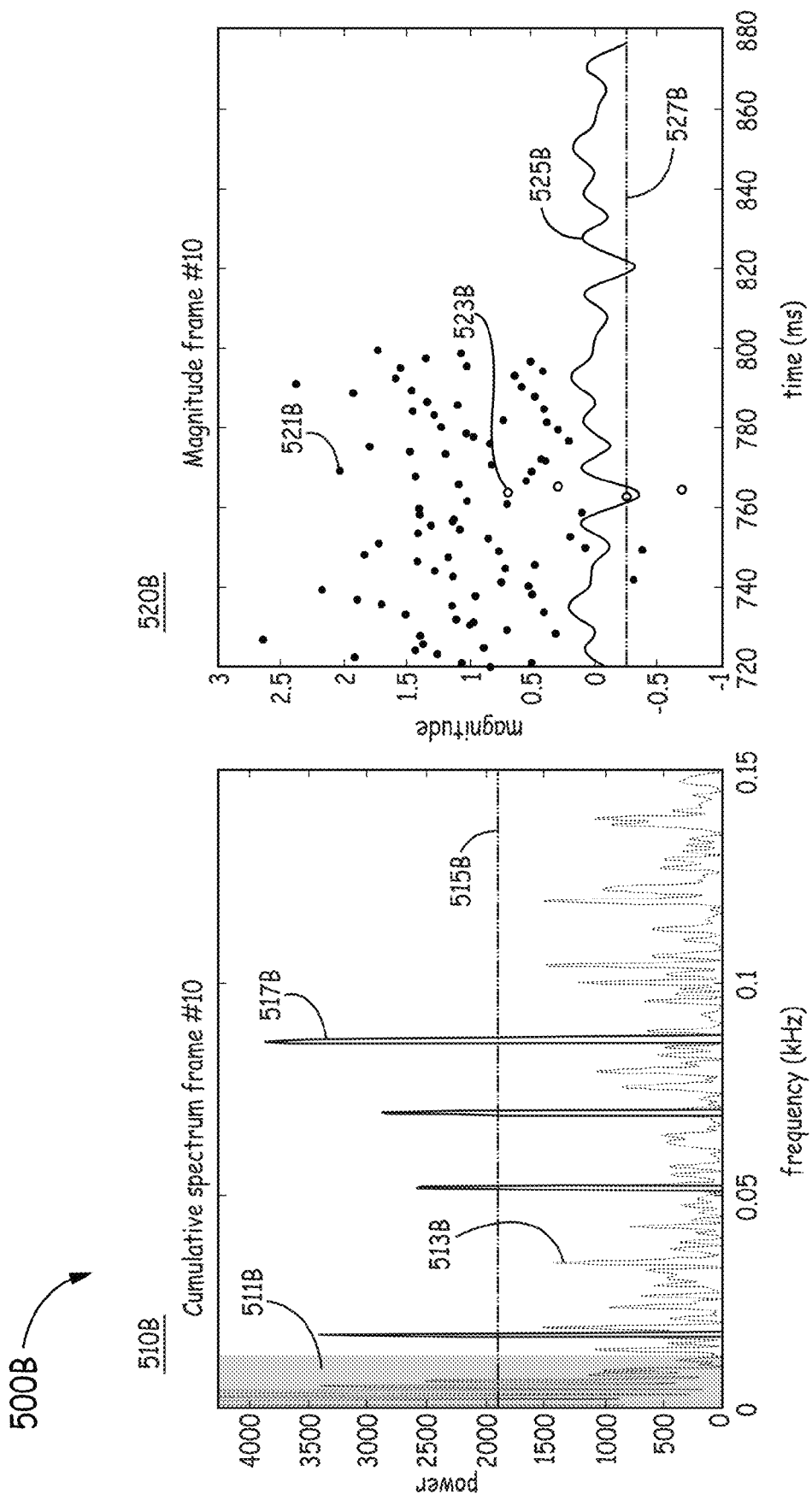
FIG. 5B illustrates a cumulative spectrum power graphs and magnitudes of the inverse fast fourier transformed signal for the current and next frame as seen by a receiver, according to one embodiment at 10 frames of data.
Figure 5C:
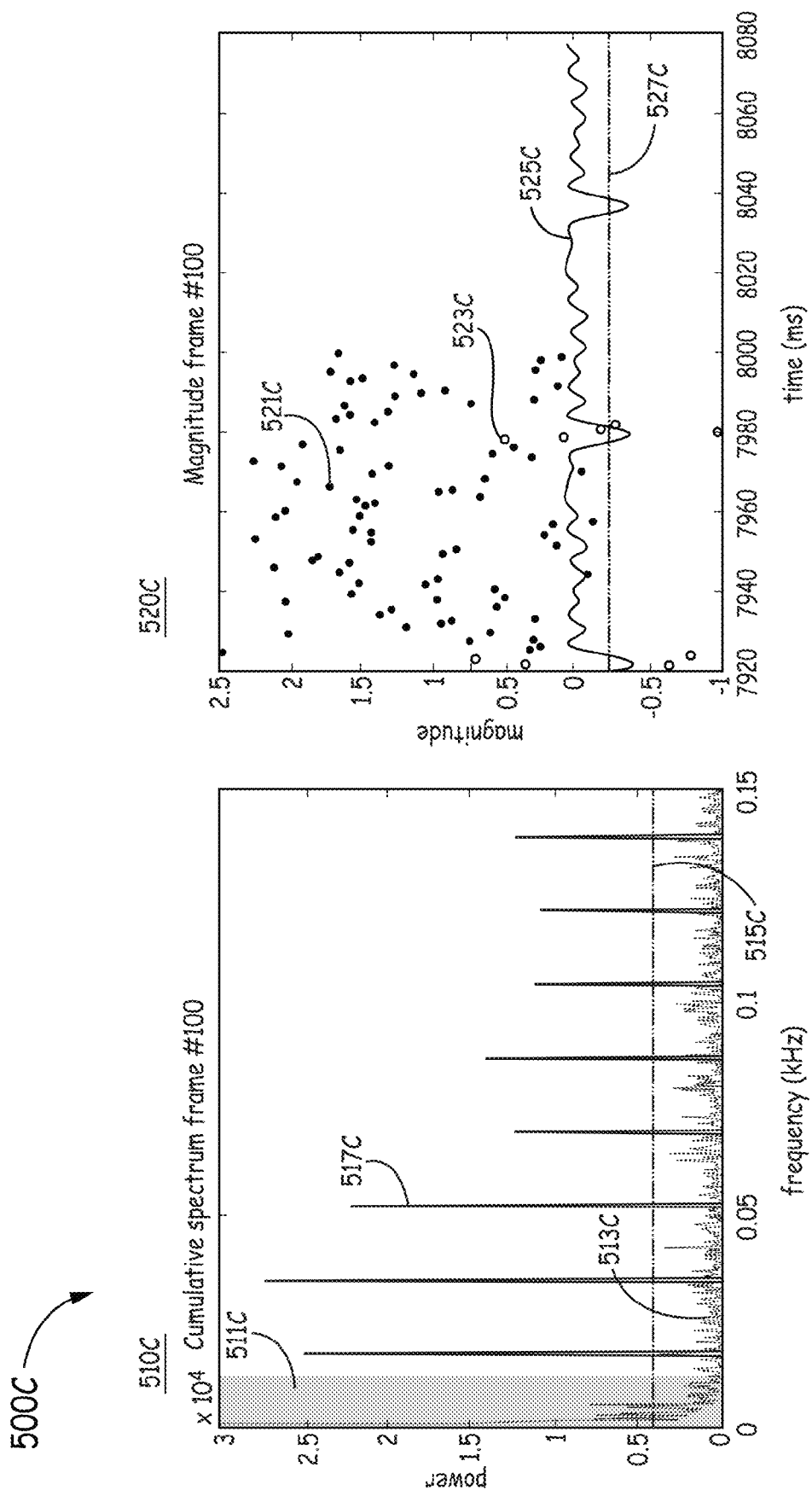
FIG. 5C illustrates a cumulative spectrum power graphs and magnitudes of the inverse fast fourier transformed signal for the current and next frame as seen by a receiver, according to one embodiment at 100 frames of data.
Figure 5D:
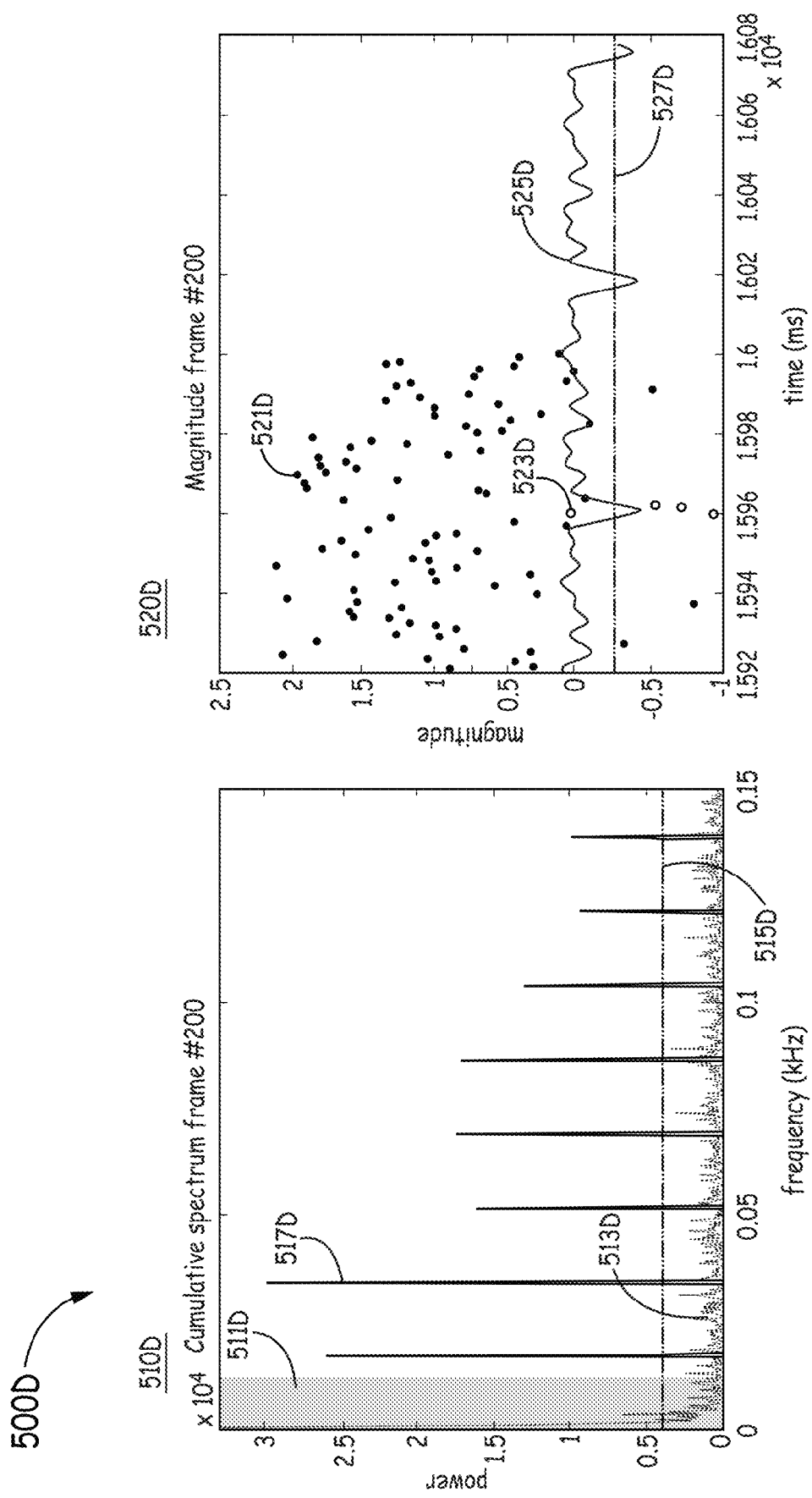
FIG. 5D illustrates a cumulative spectrum power graphs and magnitudes of the inverse fast fourier transformed signal for the current and next frame as seen by a receiver, according to one embodiment at 500 frames of data.

FIG. 4 is a hardware block diagram of an example system for mitigation of helicopter rotor blockage. The system 400 includes an antenna 410, and receiver 411, a processor 423, and memory and/or computer readable media 425. In one embodiment, the antenna 410 and receiver 411 are a satellite antenna and satellite receiver. Antenna 410 is coupled to a receiver 411 and is configured to be able to send and receive a communications signal. Receiver 411 is coupled to processor 423. In some embodiments, processor 423 may include more than one processor, a single processor with multiple cores, or other processor configuration known to those having ordinary skill in the art. Processor 423 is coupled to system memory and/or computer readable media 425, comprising helicopter rotor blockage prediction and mitigation instructions 427. In other embodiments, processor 423 and computer readable media 425 may be implemented in a system on a chip configuration, application specific integrated circuit (ASIC), a digital signal processor (DSP), programmable logic such as a Field Programmable Gate Array, digital hardware, or other acceptable alternatives as known to those having ordinary skill in the art. Helicopter rotor blockage prediction and mitigation instructions 427 include instructions, which when executed by processor 423 cause the processor 423 to Fast Fourier Transform (FFT) pilot symbols in each frame of data received by the receiver, rotate the FFT bin results spectrum to adjust the phases to implement a delay of one frame, perform a leaky coherent integration by adding the results of the rotation with a forgetting factor applied to the accumulated FFT bin result spectrum, calculate a threshold using a mean bin energy of the FFT bin spectrum, mask the signal results by retaining only the FFT bins that exceed the threshold and their adjacent FFT bins above the minimum expected rotor blocking frequency, inverse FFT (IFFT) the signal to obtain an time domain signal gain, and erase the pilot symbols below the threshold removing them from the signal parameter estimation. In one embodiment, bit LLRs associated with the blocked data symbols are set to zero. In other embodiments, a de-weighting or modification of the blocked portions of the signal may be used.

In some embodiments, these instructions may typically be stored on any appropriate computer readable medium used for storage of computer readable instructions or data structures. The computer readable medium 425 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In other embodiments, receiver 411 is coupled to a helicopter rotor blockage predictor unit 420 configured to Fast Fourier Transform (FFT) pilot symbols in each frame of data received by the receiver, rotate the FFT bin results spectrum to adjust the phases to implement a delay of one frame, perform a leaky coherent integration by adding the results of the rotation with a forgetting factor applied to the accumulated FFT bin result spectrum, calculate a threshold using a mean bin energy of the FFT bin spectrum, mask the signal results by retaining only the FFT bins that exceed the threshold and their adjacent FFT bins above the minimum expected rotor blocking frequency, inverse FFT (IFFT) the signal to obtain an time domain signal gain, and erase the pilot symbols below the threshold removing them from the signal parameter estimation. In one embodiment, bit LLRs associated with the blocked symbols are set to zero. In some embodiments, the helicopter rotor blockage predictor unit 420 comprises processor 423 and computer readable media and/or system memory 425 further comprising helicopter rotor blockage prediction and mitigation instructions 427.

FIGS. 5A-5D illustrate cumulative spectrum power graphs and magnitudes of the IFFT'd signal for the current and next frame as seen by a receiver according to one embodiment at 5, 10, 100 and 500 frames of data. 500A illustrates the graphs at 5 frames of data. The cumulative spectrum graph 510A illustrates an ignored DC component 511A, a cumulative spectrum power 513A, a blockage threshold 515A, and the masked spectrum 517A. The cross symbols at the top of masked spectrum 517A denote the peaks of the spectrum. The fundamental blockage frequency is 17 hertz (Hz) and the harmonics are integer multiples of the fundamental frequency. These graphs are then shown in FIG. 500B for 10 frames, 500C for 100 frames, and 500D for 500 frames of data.

The magnitude graph 520A shows an IFFT'd signal 525A for the current and next frame. The threshold 527A indicates the threshold below which if the IFFT'd signal 525A falls below, a blockage is predicted to occur. The pilot symbols are depicted as unblocked pilot symbols 521A, and blocked pilot symbols 523A.

EXAMPLE EMBODIMENTS

Example 1 includes a method for mitigating helicopter rotor blockage of communications comprising: fast fourier transforming (FFT) pilot symbols of one current frame of data of a series of at least one frame of data; implementing a time delay of one frame; applying a forgetting factor to an accumulated spectrum, wherein the forgetting factor is a factor of less than one, wherein the accumulated spectrum is a fast fourier transformed of at least one previous frame of data of a series of at least one frame of data; performing a leaky coherent integration, wherein the leaky coherent integration adds a result of the fast fourier transform of the one current frame of data to the accumulated spectrum; calculating a threshold, wherein the threshold is based on a mean energy of all FFT bins in the accumulated spectrum, wherein bins are characterized by a discrete range of frequencies along the accumulated spectrum; masking the FFT bins, wherein masking comprises retaining only FFT bins that exceed the threshold and above a minimum expected rotor blocking frequency and adjacent FFT bins; inverse fast fourier transforming the accumulated spectrum; erasing the pilot symbols below the threshold and removing them from signal parameter estimation; erasing data symbols that lie in a blockage by setting bit-log likelihood ratios to zero.

Example 2 includes the method of example 1 wherein implementing a delay of one frame comprises rotating the accumulated fast fourier transform (FFT) bin results to adjust a phase, wherein the adjustment to the phase creates a delay of one frame.

Example 3 includes the methods of any of examples 1 or 2, wherein the threshold indicates an energy level below which a blockage occurs.

Example 4 includes the method of any of example 1-3, wherein pilot symbols below the threshold are de-weighted before performing parameter estimation.

Example 5 includes the method of any of examples 1-4, wherein de-weighting is relative to the threshold.

Example 6 includes the method of examples 1-5 wherein the fast fourier transform is a real to complex fast fourier transform.

Example 7 includes the method of any of example 1-6 wherein the fast fourier transform computes only positive frequency FFT bins or negative frequency FFT bins.

Example 8 includes the method of any of claims 1-5, wherein the fast fourier transform is a complex to complex fast fourier transform having a fast fourier transform length half of a real to complex fast fourier transform length.

Example 9 includes the method of any of examples 1-8, wherein the accumulated spectrum has no previous frame information.

Example 10 includes a system for mitigating helicopter rotor blockage of communications comprising: a receiver configured to receive a signal, the signal comprising frames of data, wherein the frames of data contain regularly spaced pilot symbols; at least one programmable processor coupled to the receiver; a processor-readable medium on which program instructions are configured, when executed by at least one programmable processor, to cause the at least one programmable processor to: fast fourier transform (FFT) the pilot symbols of one current frame of data of a series of at least one frame of data; implement a time delay of one frame; apply a forgetting factor to an accumulated spectrum, wherein the forgetting factor is a factor of less than one, wherein the accumulated spectrum is a fast fourier transformed of at least one previous frame of data of a series of at least one frame of data; perform a leaky coherent integration, wherein the leaky coherent integration adds a result of the fast fourier transform of the one current frame of data to the accumulated spectrum; calculate a threshold, wherein the threshold is based on a mean energy of all FFT bins in the accumulated spectrum, wherein FFT bins are characterized by a discrete range of frequencies along the accumulated spectrum; mask the FFT bins, wherein masking comprises retaining only FFT bins that exceed the threshold and above a minimum expected rotor blocking frequency and adjacent FFT bins; and inverse fast fourier transform the accumulated spectrum.

Example 11 includes the system of example 10, wherein implementing a delay of one frame comprises rotating the accumulated fast fourier transform (FFT) bin results to adjust phase angles.

Example 12 includes the system of any of examples 10-11, wherein the program instructions are further configured to cause the at least one programmable processor to set bit log likelihood ratios associated with data symbols within a blockage to zero.

Example 13 includes the system of any of examples 10-12, wherein the program instructions are further configured to cause the at least one programmable processor to de-weight blocked pilot symbols.

Example 14 includes the system of any of examples 10-13, wherein the program instructions are configured to cause the at least one programmable processor to perform a real to complex fast fourier transform.

Example 15 includes the system of any of examples 10-14, wherein the program instructions are configured to cause the at least one programmable processor to compute a fast fourier transform for only positive frequency FFT bins or negative frequency FFT bins.

Example 16 includes the system of any of examples claim 10-13, wherein the program instructions are configured to cause the at least one programmable processor to perform a complex to complex fast fourier transform having a fourier fast transform length half of a real to complex fast fourier transform length.

Example 17 includes the system of any of examples 10-16, wherein the receiver is a satellite receiver configured to receive a satellite signal, the signal comprising frames of data, wherein the frames of data contain regularly spaced pilot symbols.

Example 18 includes an apparatus comprising: an antenna coupled to a receiver, the antenna and receiver configured to receive a signal, the signal comprising frames of data, wherein the frames of data contain regularly spaced pilot symbols; a helicopter rotor blockage predictor unit configured to: fast fourier transform (FFT) the pilot symbols of one current frame of data of a series of at least one frame of data; implement a time delay of one frame; apply a forgetting factor to an accumulated spectrum, wherein the forgetting factor is a factor of less than one, wherein the accumulated spectrum is a fast fourier transform of at least one previous frame of data of a series of at least one frame of data; perform a leaky coherent integration, wherein the leaky coherent integration adds a result of the fast fourier transform of the one current frame of data to the accumulated spectrum; a signal estimation unit configured to: calculate a threshold, wherein the threshold is based on a mean energy of all FFT bins in the accumulated spectrum, wherein bins are characterized by a discrete range of frequencies along the accumulated spectrum; mask the FFT bins, wherein masking comprises retaining only FFT bins that exceed the threshold and above a minimum expected rotor blocking frequency and adjacent FFT bins; and inverse fast fourier transform the accumulated spectrum.

Example 19 includes the apparatus of example 18, wherein the helicopter rotor blockage predictor unit implements a delay of one frame by rotating the accumulated fast fourier transform (FFT) bin results to adjust a phase, wherein the adjustment to the phase creates a delay of one frame.

Example 20 includes the apparatus of any of examples 18 or 19, wherein the signal estimation unit is configured to set bit log likelihood ratios associated with data symbols in a blockage to zero.

What is claimed is:

1. A method for mitigating helicopter rotor blockage of communications comprising:
    receiving a signal comprising frames of data, wherein the frames of data contain regularly spaced pilot symbols;
    Fast Fourier Transforming (FFT) pilot symbols of one current frame of data of a series of at least one frame of data;
    implementing a time delay of one frame;
    applying a forgetting factor to an accumulated spectrum, wherein the forgetting factor is a factor of less than one, wherein the accumulated spectrum is a FFT of at least one previous frame of data of a series of at least one frame of data;
    performing a leaky coherent integration, wherein the leaky coherent integration adds a result of the FFT of the one current frame of data to the accumulated spectrum;
    calculating a threshold, wherein the threshold is based on a mean energy of all FFT bins in the accumulated spectrum, wherein FFT bins are characterized by a discrete range of frequencies along the accumulated spectrum;
    masking the FFT bins, wherein masking comprises retaining only FFT bins that exceed the threshold and above a minimum expected rotor blocking frequency and adjacent FFT bins;
    inverse FFT the accumulated spectrum;
    erasing pilot symbols below the threshold by removing the pilot symbols from signal parameter estimation;
    erasing data symbols that lie in a blockage by setting bit-log likelihood ratios to zero.

2. The method of claim 1 wherein implementing a delay of one frame comprises rotating the accumulated FFT bin results wherein the adjustment to the phase creates a delay of one frame.

3. The method of claim 1, wherein the threshold indicates an energy level below which a blockage occurs.

4. The method of claim 1, wherein pilot symbols below the threshold are de-weighted before performing parameter estimation.

5. The method of claim 4, wherein de-weighting is relative to the threshold.

6. The method of claim 1 wherein the FFT is a real to complex fast fourier transform.

7. The method of claim 1 wherein the FFT computes only positive frequency FFT bins or negative frequency FFT bins.

8. The method of claim 1, wherein the FFT is a complex to complex FFT having a FFT length half of a real to complex FFT length.

9. The method of claim 1, wherein the accumulated spectrum has no previous frame information.

10. A system for mitigating helicopter rotor blockage of communications comprising:
    a receiver configured to receive a signal, the signal comprising frames of data, wherein the frames of data contain regularly spaced pilot symbols;
    at least one programmable processor coupled to the receiver;
    a processor-readable medium on which program instructions are configured, when executed by at least one programmable processor, to cause the at least one programmable processor to:

Fast Fourier Transform (FFT) the pilot symbols of one current frame of data of a series of at least one frame of data;

implement a time delay of one frame;

apply a forgetting factor to an accumulated spectrum, wherein the forgetting factor is a factor of less than one, wherein the accumulated spectrum is a FFT of at least one previous frame of data of a series of at least one frame of data;

perform a leaky coherent integration, wherein the leaky coherent integration adds a result of the FFT of the one current frame of data to the accumulated spectrum;

calculate a threshold, wherein the threshold is based on a mean energy of all FFT bins in the accumulated spectrum, wherein FFT bins are characterized by a discrete range of frequencies along the accumulated spectrum;

mask the FFT bins, wherein masking comprises retaining only FFT bins that exceed the threshold and above a minimum expected rotor blocking frequency and adjacent FFT bins;

inverse FFT the accumulated spectrum;

erase pilot symbols below the threshold by removing the pilot symbols from signal parameter estimation; and erase data symbols that lie in a blockage by setting bit-log likelihood ratios to zero.

11. The system of claim 10, wherein implementing a delay of one frame comprises rotating the accumulated FFT bin results to adjust phase angles.

12. The system of claim 10, wherein the program instructions are further configured to cause the at least one programmable processor to de-weight blocked pilot symbols relative to the threshold.

13. The system of claim 10, wherein the program instructions are configured to cause the at least one programmable processor to perform a real to complex FFT.

14. The system of claim 10, wherein the program instructions are configured to cause the at least one programmable processor to compute a FFT for only positive frequency FFT bins or negative frequency FFT bins.

15. The system of claim 10, wherein the program instructions are configured to cause the at least one programmable processor to perform a complex to complex FFT having a FFT length half of a real to complex FFT length.

16. The system of claim 10, wherein the receiver is a satellite receiver configured to receive a satellite signal, the signal comprising frames of data, wherein the frames of data contain regularly spaced pilot symbols.

17. An apparatus comprising:

an antenna coupled to a receiver, the antenna and receiver configured to receive a signal, the signal comprising frames of data, wherein the frames of data contain regularly spaced pilot symbols;

a helicopter rotor blockage predictor unit configured to:

Fast Fourier Transform (FFT) the pilot symbols of one current frame of data of a series of at least one frame of data;

implement a time delay of one frame;

apply a forgetting factor to an accumulated spectrum, wherein the forgetting factor is a factor of less than one, wherein the accumulated spectrum is a FFT of at least one previous frame of data of a series of at least one frame of data;

perform a leaky coherent integration, wherein the leaky coherent integration adds a result of the FFT of the one current frame of data to the accumulated spectrum;

calculate a threshold, wherein the threshold is based on a mean energy of all FFT bins in the accumulated spectrum, wherein FFT bins are characterized by a discrete range of frequencies along the accumulated spectrum;

mask the FFT bins, wherein masking comprises retaining only FFT bins that exceed the threshold and above a minimum expected rotor blocking frequency and adjacent FFT bins;

inverse FFT the accumulated spectrum;

erase pilot symbols below the threshold by removing the pilot symbols from signal parameter estimation; and erase data symbols that lie in a blockage by setting bit-log likelihood ratios to zero.

18. The apparatus of claim 17, wherein the helicopter rotor blockage predictor unit implements a delay of one frame by rotating the accumulated FFT bin results to adjust phase angles, wherein the adjustment to the phase creates a delay of one frame.

* * * * *